(No Model.)

R. BESSEL.
TREE PROTECTOR.

No. 442,095. Patented Dec. 9, 1890.

Witnesses— 
W. F. Keene. 
F. L. Middleton.

Inventor.
Rudolph Bessel
by Ellis Spear
Atty

UNITED STATES PATENT OFFICE.

RUDOLF BESSEL, OF PAULAU, NEAR BRIEG, GERMANY.

TREE-PROTECTOR.

SPECIFICATION forming part of Letters Patent No. 442,095, dated December 9, 1890.

Application filed April 12, 1889. Serial No. 307,048. (No model.)

*To all whom it may concern:*

Be it known that I, RUDOLF BESSEL, of Paulau, near Brieg, in the Kingdom of Prussia and German Empire, have invented a new and useful Apparatus for Protecting Trees from Caterpillars, of which the following is a specification, reference being had therein to the accompanying drawings.

My invention relates to providing protective arrangements or apparatus which shall prevent caterpillars and other insects from injuring trees, plants, shrubs, and the like.

My protective arrangements are so devised that the caterpillar or other insect is either hindered from going forward or is wounded or killed in its ascent.

Figure 1:
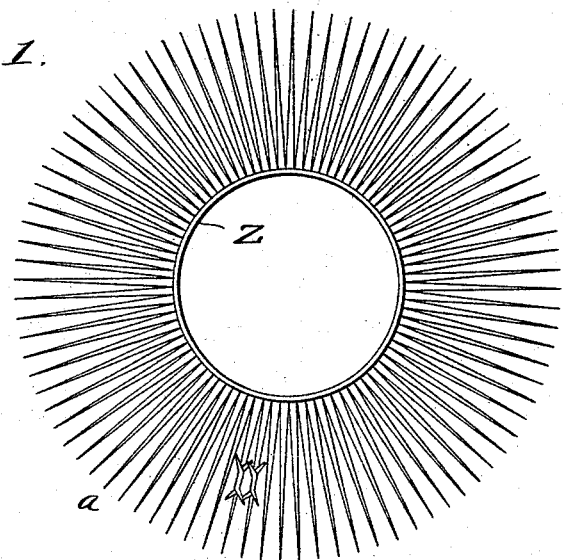
Figure 2:
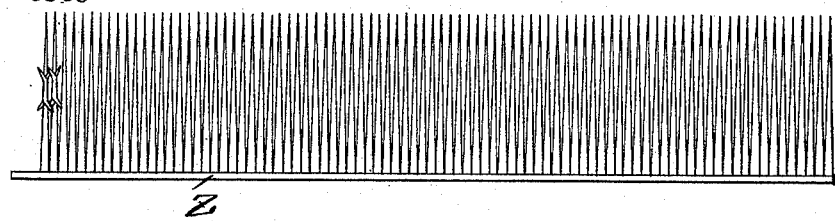
Figure 3:
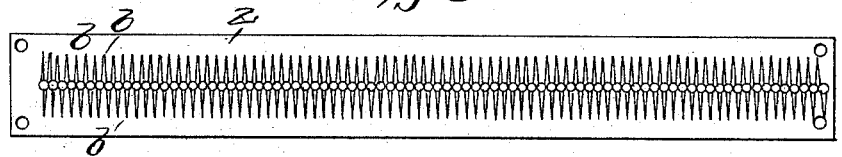
Figure 4:
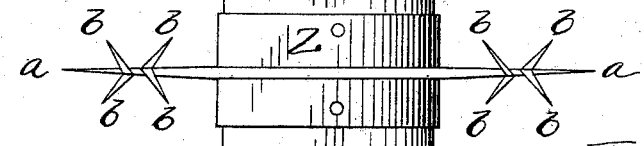

Figure 1 is a plan view of the protector ready for use. Fig. 2 is a side view before it is placed in position. Fig. 3 is a plan view of the device shown in Fig. 2, and Fig. 4 is a side elevation of the protector in place upon the tree.

My protector consists of a band F, preferably made of tin-plate, about twenty millimeters in breadth, in the center line of the outer circumference of which very sharp-pointed needles $a$ are placed together in a row, as shown in plan at Fig. 1. Fig. 2 shows the arrangement extended, in side view; Fig. 3, also extended, in a plan view, while Fig. 4 shows the attachment to the tree-stem. The needles do not exceed about one to one and a half millimeters in diameter and thirty millimeters in length, and are very sharp-pointed. About the middle of each needle four or other number of sharp points $b$ are fixed. When four are used, they are arranged in pairs and placed opposite each other, in this way filling up the interspaces between the needles. By these sharp points, so arranged, the ascending and descending caterpillars are wounded and killed, experience showing that every caterpillar so wounded dies.

The tin-plate band is attached to the tree-stem by laying the plate round the stem in such manner that the holes at each end of the plate lie one over the other, and by driving wire tacks through these holes the plate is secured to the tree. Any spaces left between the bark and the tin-plate band are filled up with clay or similar substance.

The base-plate, being formed of metal, presents a slippery surface, against which the insects cannot hold fast, and this will aid in protecting the tree, as some of the insects will fall before reaching the needles.

I claim as my invention—

A tree-protector consisting of a band adapted to be secured about the tree, said band having needles projecting therefrom, pointed at their outer ends, and having in rear of said points upwardly and downwardly projecting points $b$, substantially as described.

In witness whereof I have hereunto set my hand in presence of two witnesses.

RUDOLF BESSEL.

Witnesses:
 WILHELM BINDEWALD,
 HERMANN WEISS.